United States Patent [19]

Fujiwhara et al.

[11] Patent Number: 4,871,655

[45] Date of Patent: Oct. 3, 1989

[54] LIGHT-SENSITIVE SILVER HALIDE COLOR PHOTOGRAPHIC MATERIAL CONTAINING MULTI-FUNCTIONAL DYE

[75] Inventors: Mitsuto Fujiwhara; Takashi Uchida; Toshihiko Kimura, all of Hino, Japan

[73] Assignee: Konica Corporation, Tokyo, Japan

[21] Appl. No.: 139,640

[22] Filed: Dec. 30, 1987

[30] Foreign Application Priority Data

Jan. 16, 1987 [JP] Japan .................................. 62-6050

[51] Int. Cl.$^4$ .......................... G03C 1/84; G03C 7/34; G03C 7/26
[52] U.S. Cl. ................................... 430/519; 430/548; 430/551; 430/553; 430/562; 430/359
[58] Field of Search ............... 430/519, 548, 551, 359, 430/553, 226, 517, 559, 562

[56] References Cited

U.S. PATENT DOCUMENTS

| | | | |
|---|---|---|---|
| 2,434,272 | 1/1948 | Jelley et al. | 430/553 |
| 2,455,169 | 11/1948 | Glass et al. | 430/359 |
| 2,503,717 | 4/1950 | Fierke et al. | 430/519 |
| 2,725,291 | 11/1955 | Graham | 430/548 |
| 2,808,329 | 10/1957 | Whitmore | 430/359 |
| 2,857,277 | 10/1958 | Sprung | 430/519 |
| 3,028,238 | 4/1962 | Poschel et al. | 430/551 |
| 4,029,503 | 6/1977 | Fujiwhara et al. | 430/226 |
| 4,690,888 | 9/1987 | Fujiwhara et al. | 430/359 |

*Primary Examiner*—Richard L. Schilling
*Attorney, Agent, or Firm*—Finnegan, Henderson, Farabow, Garrett & Dunner

[57] ABSTRACT

A light-sensitive silver halide color photographic material, comprising at least one photographic constituent layer containing a multi-functional dye which becomes substantially colorless in the presence of the oxidized product of a color developing agent through the reaction with the oxidized product, and becomes substantially colorless in the absence of the oxidized product of the color developing agent during the color-photographic processing step.

According to the present invention, a color light-sensitive material containing a multi-functional compound having excellent sharpness, good color reproducibility and further excellent graininess can be obtained.

8 Claims, No Drawings

LIGHT-SENSITIVE SILVER HALIDE COLOR PHOTOGRAPHIC MATERIAL CONTAINING MULTI-FUNCTIONAL DYE

BACKGROUND OF THE INVENTION

This invention relates to a light-sensitive silver halide color photographic material containing a multi-functional compound (hereinafter referred to as color light-sensitive material), more particularly to a color light-sensitive material containing a multi-functional compound having excellent sharpness, good color reproducibility and further excellent graininess.

It has been demanded in the art for color light-sensitive materials to have higher performances, and in recent years, particularly good sensitivity, sharpness, color reproducibility, graininess are now demanded to be satisfied at the same time.

Accordingly, for satisfying these demands, it has been practice to add various additives.

For example, various additives are contained such as coupler, inhibitor, non-photosensitive dye (e.g. dye for absorbing light with a specific wavelength, which is added in the constituent layer of color light-sensitive material for the purpose of light absorption filter, antihalation, antiirradiation, sensitivity control, etc.) and anti-color-stain agents (prevention of the so-called "color staining" concerning "color turbidity" generated by migration of the oxidized product of color developing agent to adjacent image forming layers and "color fogging" generated by the oxidized product of color developing agent formed by air oxidation, fogging of emulsion, etc.). However, these additives which are compounds of different kinds from each other, must be used in necessary number of compounds, and therefore for production of color light-sensitive materials, not only synthesis of the respective compounds and equipments therefor are required, but also complicated preparations of coating solutions are required.

SUMMARY OF THE INVENTION

In view of the above problem, it has been practiced in the prior art to attempt multi-functionalization of the additive, for example, hybridization of a coupler with a anti-color-stain agents, etc.

However, there has been attempted no hybridization by incorporation of a non-photosensitive dye and anti-color-stain agents in the same molcule. For, non-photosensitive dye is a styryl dye or oxonol dye, which is essentially required to be decolored during developing or during processing thereafter, and for permitting it to be flowed out easily, water-soluble groups such as sulfonic acid group, carboxylic acid group, etc. are introduced and further it is modified to be readily reduced with sulfite ions or color developing agent, etc. That is, it may be said to be a kind of oxidizing agent. On the other hand, anti-color-stain agents is quencher of the oxidized product of a color developing agent, and therefore it is a reducing agent as a matter of course. Thus, when the relationship of these two kinds of compounds, which are oxidizing agent and reducing agent, is considered, it would be far from the common sense of those skilled in the art to subject the two into docking. Whereas, the present inventors dared to challenge this point and, as the result of extensive studies, unexpectedly found that a color light-sensitive mateial with excellent sharpness and graininess as well as good color reproducibility can be obtained by introducing a non-photosensitive dye and a anti-color-stain agents into the same molcule.

An object of the present invention is to provide a color light-sensitive material, which is not only reduced in various equipments accompanied with the production of color light-sensitive materials and requires no complicated preparation of coating solutions, etc., but also has excellent sharpness, graininess as well as good color reproducibility.

The above object has been accomplished by a light-sensitive silver halide color photographic material, comprising at least one photographic constituent layer containing a multi-functional dye which becomes substantially colorless in the presence of the oxidized product of a color developing agent through the reaction with said oxidized product, and becomes substantially colorless in the absence of said oxidized product of a color developing agent during the color-photographic processing step (hereinafter referred to as the compound of the present invention).

In the present specification, the term "to become substantially colorless" is not limited to the case when the reaction products with the oxidized product of the color developing agent are colorless compounds when the dye itself changes into a colorless compound, but is also used to mean as inclusive of the case when said colorless compound, dye itself or the reaction product with said oxidized product are flowed out into the processing solution during the color-photographic processing steps. The term "substantially colorless" is that optical density within the range of 30 nm from the maximum absorption wavelength in main absorption region of the multi-functional compound of the present invention after the color-photographic processing steps becomes $\frac{1}{3}$ or less, preferably 1/5 or less, to the optical density of the maximum absorption wavelength before the color-photographic processing steps. In the case that the multi-functional compound is used within the preferable concentration as a non-photosensitive dye, the above-mentioned optical density after the color-photographic processing step should become 0.2 or less, preferably 0.15 or less, of that before the color-photographic processing steps.

The above optical density can be measured, for example, by use of a test sample having the multi-functional compound of the present invention and the light-sensitive silver halide emulsion on a support.

The compound of the present invention may have the functions as described above, and not particularly limited. For example, those represented by the formula (I) or (II) may be included.

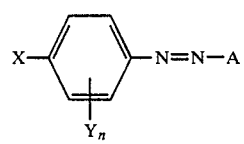

Formula (I)

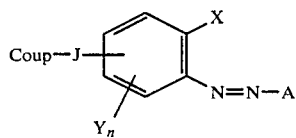

Formula (II)

In the formulae (I) and (II),

Coup is a coupler residue linked to J at the active site;

J is a divalent group;

A is an aryl group having hydroxyl group at o-position or p-position relaive to azo group;

X is a hydroxyl group or an amino group;

Y is a monovalent organic group or a monovalent atom, and may form a naphthalene ring together with the benzene ring in the formula;

n is an integer of 0 to 4.

Examples of the coupler residue may include coupler residues such as of phenol type, naphthol type, etc.; examples of the aryl group represented by A may include phenyl and naphthyl groups, and these include those having substituents; examples of the divalent group may include —N=N—, —O—, —S—, —NHSO$_2$—; the amino group represented by X is inclusive of substituted amino groups such as monoalkylamino, etc.; examples of the monovalent atom represented by Y may include halogen atoms such as chlorine atom, etc.; and monovalent organic group may include alkyl groups such as methyl, ethyl and the like.

When n is 2 to 4, the respective Y in the same formula may be either identical or different.

Also, the case when at least one of the substituents on the aryl group represented by A or Y is an electron attractive group, particularly —CONH(CH$_2$)$_m$COOR (m is an integer of 1 to 3, R is a hydrogen atom or an alkyl group having 2 or less carbon atoms) is preferred. Y may also preferably be —NHCOR (R has the same meaning as defined above).

Specific examples of the compound of the present invention are shown below, but the present invention is not limited thereto.

Among the compounds of formulae (I) and (II), the preferable compound is represented by the following formula:

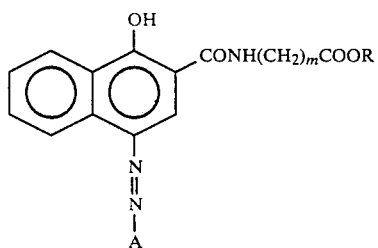

in the above formula, A has the same meaning as defined above, R is a hydrogen atom or an alkyl group having 2 or less carbon atoms and m is an integer of 1 to 3.

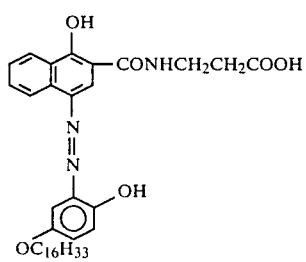
(1)

-continued

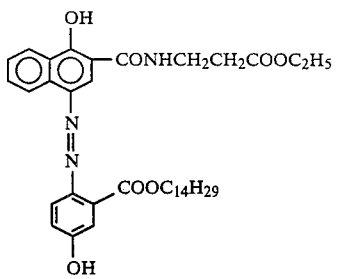
(2)

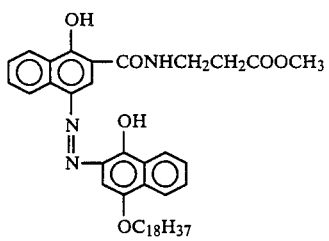
(3)

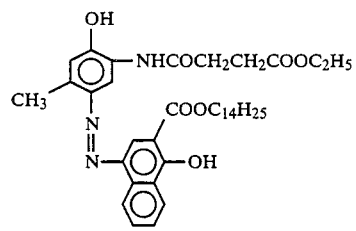
(4)

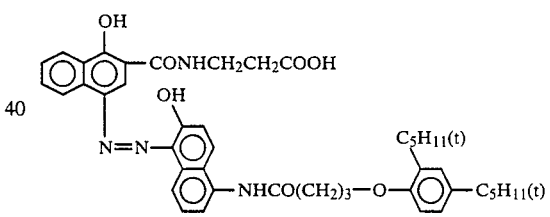
(5)

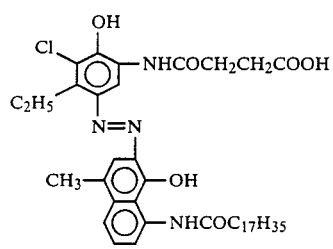
(6)

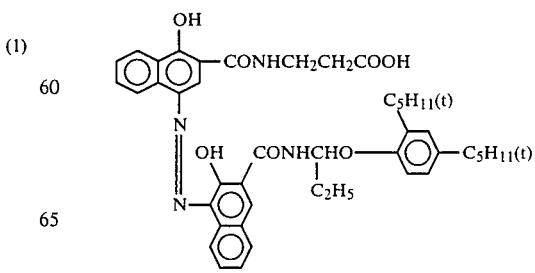
(7)

-continued (8) 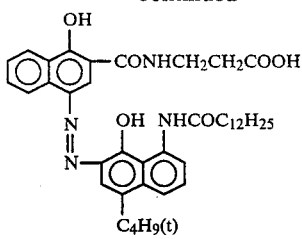

(9) 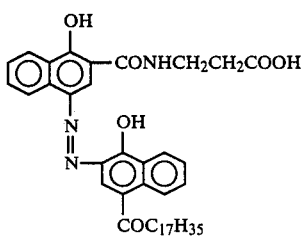

(10) 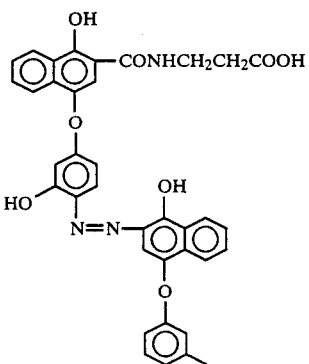

(11) 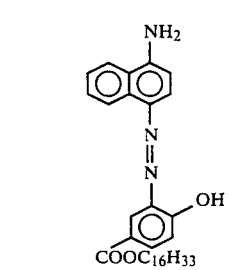

(12) 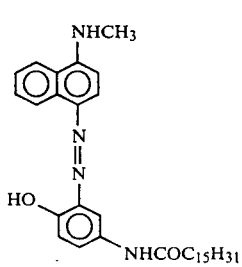

(13) 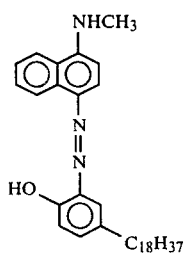

-continued

(14) 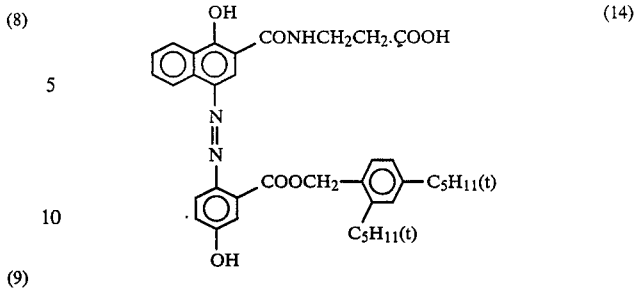

SYNTHESIS EXAMPLE (1)

Synthesis of 4-nitro-2-phenoxycarbonyl-1-naphthol:

12 ml of fuming nitric acid (d=1.5) was added dropwise to a solution of 53 g of 2-phenoxycarbonyl-1-naphthol dissolved in 200 ml of chloroform was added dropwise 12 cc of fuming nitric acid (d=1.5) at 10° C. to 30° C. After 30 minutes, the precipitated crystals were filtered, washed well with cooled chloroform to obtain the desired product at a yield of 62%. The product had m.p. of 157° C., and was confirmed by NMR, Mass spectra.

SYNTHESIS EXAMPLE (2)

Synthesis of 2-(2-carboxyethylamino)carbonyl-4-nitro-1-naphthol 1,500 ml of ethanol was added to a solution of 56.8 g of potassium hydroxide dissolved in 100 cc of water. 47 g of β-alanine was dissolved into this mixture, and then 132 g of 4-nitro-2-phenoxycarbonyl-1-naphthol was suspended, followed by reflux for 4 hours. After the reaction was completed, the solution was cooled, followed, by filtration of crystal. The obtained crystal was dissolved in 4,000 ml of water. After the insolubles were filtered off, the aqueous solution was neutralized with hydrochloric acid to give yellow crystals. Recrystallization from 5,000 ml of ethanol gave the desired product at a yield of 70%.

The product was confirmed by NMR, Mass spectra. m.p. 254° C. (decompd.).

SYNTHESIS EXAMPLE (3)

(a) Synthesis of 4-amino-2-(2-methoxycarbonylethylamino)carbonyl-1-naphthol:

An amount of 210 g of 4-nitro-2-(2-carboxyethylamino)carbonyl-1-naphthol was dissolved in 28 liters of methanol at 40° C. Into this solution was added 1,200 ml conc. hydrochloric acid, followed subsequently by portionwise addition of 430 g of zinc powder. After 30 minutes, zinc was removed and the solvent was removed by evaporation under reduced pressure. The residue was dissolved in 25 liters of ethyl acetate, washed with water and then dried over magnesium sulfate, followed by evaporation of the solvent, to give crystals. The crystals were washed with acetonitrile to obtain substantially pure desired product as hydrochloride. Yield was 75%. The product was confirmed by NMR, Mass spectra.

(b) Synthesis of 1-acetyloxy-4-octadecyloxynaphthalene:

An amount of 250 ml of octadecanol was dissolved by heating to 60° C. and 8.0 g of hydrochloric acid gas was blown thereinto little by little. Next, 44.5 g of anhydrous tin chloride and 25.0 g of 1,4-naphthoquinone were added, and the mixture was heated on a water bath of 75° C. for 2 hours. After the reaction, the product was poured into 1,000 ml of ethyl acetate, the insolubles were filtered off, and the ethyl acetate layer was washed with water. After evaporation of ethyl acetate under reduced pressure, octadecanol was recovered by vacuum distillation. The residue was dissolved in 30 ml of anhydrous acetic acid, and 2 to 3 drops of conc. sulfuric acid were added thereto, whereby vigorous heat generation occurred. After 30 minutes, ice-water was added, and the oily product separated was extracted with 500 ml of n-hexane. After washing with water and drying, the solvent ws evaporated and the residue was purified by column chromatography to obtain a thick syruppy desired product at a yield of 52%. The product was confirmed by NMR, Mass spectra.

SYNTHESIS EXAMPLE (4)

Synthesis of exemplary compound (3):

An amount of 30 g of 4-amino-2-(2-methoxycarbonylethylamino)-carbonyl-1-naphthol hydrochloride was dissolved in 750 ml of acetone, 200 ml of water and 18.5 ml of conc. hydrochloric acid, cooled to −5° C. and a solution of 7.0 g of sodium nitrite dissolved in 50 ml of water was added dropwise thereinto. After stirring for 1 hour, the aquired diazonium salt was adjusted to pH 7.0 with an aqueous sodium bicarbonate.

On the other hand, 38.1 g of 1-acetoxy-4-octadecyloxynaphthalene was dissolved in 750 ml of methanol and 750 ml of acetone, cooled to 10° C. or lower and, while passing nitrogen gas therethrough, 250 ml of 1N aqueous potassium hydroxide and 250 ml of triethylamine were added thereto. Next, the aqueous solution of the diazonium salt as described above was added little by little, whereby a dye of magenta color was formed. After 30 minutes, the product was neutralized with chloric acid and extracted with ethyl acetate, washed with water and dried. Then, the solvent was evaporated and the residue was purified by column chromatography to obtain the desired product having the main absorption at magenta at a yield of 55%. The product was confirmed by NMR, Mass spectra.

SYNTHESIS EXAMPLE (5)

Synthesis of 2-amino-4-octadecylphenol 40 ml of nitric acid (d=1.18) was added dropwise to a solution of 10 g of p-octadecylphenol dissolved in 300 ml of acetic acid at 10° to 40° C. After one hour, the reaction mixture was poured into water, extracted with ethyl acetate, washed with water, then with aqueous sodium bicarbonate solution, followed by drying. After the solvent was evaporated, the residued crystals were recrystallized from n-hexane. 2-Nitro-4-octadecylphenol of m.p. 71° C. was obtained in an amount of 8.4 g.

The 2-nitro derivative was dissolved in 300 ml of tetrahydrofuran and hydrogen gas was absorbed with addition of 1.0 g of Raney nickel under normal pressure and room temperature. After the reaction, the catalyst was removed by filtration, the filtrate was concentrated and the crystals were recrystallized from a solvent mixture of chloroform-n-hexane. The product (6.2 g) of m.p. 118° C. was obtained.

SYNTHESIS EXAMPLE (6)

Synthesis of exemplary compound (13):

Similar to synthesis of exemplary compound (3), but carrying out condensation under hydrochloric acidic condition, the diazotized product of 2-amino-4-octadecylphenol was coupled with 1-methylaminonaphthalene to give a yellow dye. The product was confirmed by NMR, Mass spectra.

The compound of the present invention is added in at least one layer of the photographic constituent layers of a color light-sensitive material. The photographic constituent layers are inclusive of layers constituting color light-sensitive material such as respective layers of silver halide emulsion layers, protective layer, intermediate layer, yellow filter layer, backing layer, etc. However, as the particularly preferred place in which the compound of the present invention is to be added, the layer positioned lower than the silver halide emulsion layer having photosensitivity at the main absorption wavelength region of the compound of the present invention is preferable, and a non-photosensitive layer is preferred.

The amount added may be preferably 0.001 g to 50 g, particularly 0.01 g to 10 g, per 1 g of gelatin.

As the silver halide emulsion to be used in the color light-sensitive material of the present invention, any desired conventional silver halide emulsion may be used.

Said emulsion can be chemically sensitized in a conventional manner and can be optically sensitized with the use of a sensitizing dye to a desired wavelength region.

In the silver halide emulsion, antifoggants, stabilizers, etc. can be added. As the binder in said emulsion, gelatin may be advantageously used.

The emulsion layer and other hydrophilic colloid layers can be hardened, and also plasticizers, dispersions (latices) of water insoluble or difficultly soluble synthetic polymers can be incorporated.

In the emulsion layers of the light-sensitive material for color photography, various kinds of couplers may be used.

Further, there can be used colored couplers having the effect of color correction, competing couplers, and compounds capable of releasing photographically useful fragments such as development accelerator, bleaching accelerator, developer, silver halide solvent, color controlling agent, film hardener, fogging agent, antifoggant, chemical sensitizer, spectral sensitizer and desensitizer, etc. through the coupling with the oxidized product of a developing agent.

In the color light-sensitive material, auxiliary layers such as filter layer, antihalation layer, antiirradiation layer, etc. can be provided. In these layer and/or the emulsion layers, dyes fflowed out from the light-sensitive material or bleached during the color-photographic processing may be contained.

In the color light-sensitive material, there can be added formalin scavenger, fluorescent brightener, matting agent, lubricant, image stabilizer, surfactant, color antifoggant, development accelerator, development retarder, bleaching accelerator, etc.

As the support, papers laminated with polyethylene, etc., polyethyleneterephthalate film, baryta paper, cellulose triacetate, etc. can be used.

For obtaining a dye image by use of the color light-sensitive material of the present invention, color photographic processing conventionally known in the art can be practiced after exposure.

The present invention is described by referring to the following Examples, but the embodiments of the present invention are not limited to these.

In all of the Examples shown below, the amounts added in the light-sensitive siler halide photographic material are per 1 m², unless otherwise specifically noted. Also, silver halide and colloidal silver are shown as calculated on silver.

EXAMPLE 1

On a triacetylcellulose film, the respective layers with the compositions as shown below were formed successively from the support side to prepare a multi-layer color photographic element sample-1.

The dried film thickness was controlled by the amount of gelatin.

Sample-1 (Control)

First layer: halation preventive layer (HC-1)
Gelatin layer containing black colloidal silver;
Dried film thickness 2.0 μm.

Second layer: intermediate layer (I.L.)
Gelatin layer containing emulsified dispersion of 2,5-di-t-octylhydroquinone ($1.8 \times 10^{-4}$ mol/m²);
Dried film thickness 1.0 μm.

Third layer: low sensitivity red-sensitive silver halide emulsion layer (RL-1)
Mono-dispersed emulsion (Emulsion I) comprising AgBrI with an averge grain size (r̄) of 0.30 μm and containing 6 mol% of AgI . . . Coated silver amount 1.8 g/m²
Sensitizing dye I: $6 \times 10^{-5}$ mol per 1 mol of silver
Sensitizing dye II: $1.0 \times 10^{-5}$ mol per 1 mol of silver
Cyan coupler (C-1): 0.06 mol per 1 mol of silver
Colored cyan coupler (CC-1): 0.003 mol per 1 mol of silver
DIR compound (D-1): 0.0015 mol per 1 mol of silver
DIR compound (D-2): 0.002 mol per 1 mol of silver;
Dried film thickness 2.7 μm Fourth layer: high sensitivity red-sensitive layer halide emulsion layer (RH-1)
Mono-dispersed emulsion (Emulsion II) comprising AgBrI with an average grain size of (r̄) of 0.5 μm and containing 7.0 mol% of . . . Coated silver amount 1.3 g/m²
Sensitizing dye I: $3 \times 10^{-5}$ mol per 1 mol of silver
Sensitizing dye II: $1.0 \times 10^{-5}$ mol per 1 mol of silver
Cyan coupler (C-1): 0.02 mol per 1 mol of silver
Colored cyan coupler (CC-1): 0.0015 mol per 1 mol of silver
DIR compound (D-2): 0.001 mol per 1 mol of silver;
Dried film thickness 2.0 μm.

Fifth layer: intermediate layer (I.L.)
The same gelatin layer as the second layer.

Sixth layer: low sensitive green-sensitive silver halide emulsion layer (GL-1)
Emulsion-I . . . Coated silver amount 1.5 g/m²
Sensitizing dye II: $2.5 \times 10^{-5}$ mol per 1 mol of silver
Sensitizing dye III: $1.2 \times 10^{-5}$ mol per 1 mol of silver
Magenta coupler (M-1): 0.050 mol per 1 mol of silver
Colored magenta coupler (CM-1): 0.009 mol per 1 mol of silver
DIR compound (D-1): 0.0010 mol per 1 mol of silver
DIR compound (D-3): 0.0030 mol per 1 mol of silver
Dried film thickness 2.7 μm.

Seventh layer: high sensitivity green-sensitive layer halide emulsion layer (GH-1)
Emulsion-II: Coated silver amount 1.4 g/m²
Sensitizing dye II: $1.5 \times 10^{-5}$ mol per 1 mol of silver
Sensitizing dye III: $1.0 \times 10^{-5}$ mol per 1 mol of silver
Magenta coupler (M-1): 0.020 mol per 1 mol of silver
Colored magneta coupler (CM-1): 0.002 mol per 1 mol of silver
DIR compound (D-3): 0.0010 mol per 1 mol of silver
Dried film thickness 2.0 μm.

Eight layer: yellow filter layer (YC-1)
Gelatin layer containing yellow colloidal silver and an emulsified dispersion of 2,5-di-t-octylhydroquinone ($1.8 \times 10^{-4}$ mol/m²).
Dried film thickness 1.0 μm.

Ninth layer: low sensitivity blue-sensitive silver halide emulsion layer (BL-1)
Mono-dispersed emulsion (Emulsion III) comprising AgBrI with an average grain size of 0.48 μm containing 6 mol% of AgI: Coated silver amount 0.9 g/m²
Sensitizing dye V: $1.3 \times 10^{-5}$ mol per 1 mol of silver
Yellow coupler (Y-1): 0.34 mol per 1 mol of silver
Dried film thickness 3.2 μm.

Tenth layer: high sensitivity blue-sensitive emulsion layer (BH-1)
Mono-dispersed emulsion (Emulsion IV) comprising AgBrI with an average grains size of 0.8 μm containing 15 mol% of AgI: Coated silver amount 0.5 g/m²
Sensitizing dye V . . . $1.0 \times 10^{-5}$ mol per 1 mol of silver
Yellow coupler (Y-1): 0.13 mol per 1 mol of silver
DIR compound (D-2): 0.0015 mol per 1 mol of silver
Dried film thickness 2.0 μm.

Eleventh layer: the first protective layer (Pro-1)
Gelatin layer containing:
Silver iodobromide (AgI 1 mol%, average grain size 0.07 μm) with coated silver amount 0.5 g/m²; and UV-absorbers UV-1, UV-2.
Dried film thickness 1.5 μm.

Twelfth layer: the second protective layer (Pro-2)
Gelatin layer containing polymethyl methacrylate particles (diameter: 1.5 μm) and formalin scavenger (HS-1).
Dried film thickness 1.0 μm.

In the respective layers, in addition to the above compositions, gelatin hardener (H-1) and surfactants were added.

The total dried film thickness was 22.1 μm.
The compounds contained in the respective layers of sample 1 are as follows.

Sensitizing dye I:
anhydro-5.5'-dichloro-9-ethyl-3,3'-di-(3-sulfopropyl)-thiacarbocyanine hydroxide;

Sensitizing dye II:
anhydro-9-ethyl-3,3'-di(3-sulfopropyl)-4,5,4'5'-dibenzothiacarboxyanine hydroxide;

Sensitizing dye III:
anhydro-5,5'-diphenyl-9-ethyl-3,3'-di-(3-sulfopropyl)oxacarbocyanine hydroxide;

Sensitizing dye IV:
anhydro-9-ethyl-3,3'-di(3-sulfopropyl)-5,6,5'6'-dibenzooxacarbocyanine hydroxide;

Sensitizing dye V:
anhydro-3,3'-di(3-sulfopropyl)-4,5-benzo-5'-methoxythiacyanine.

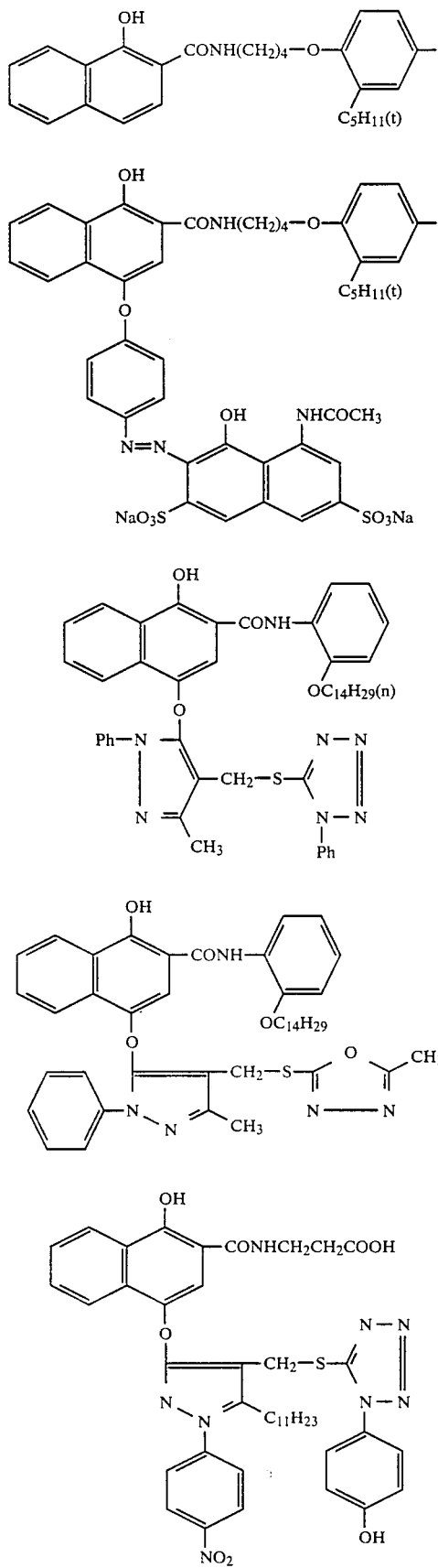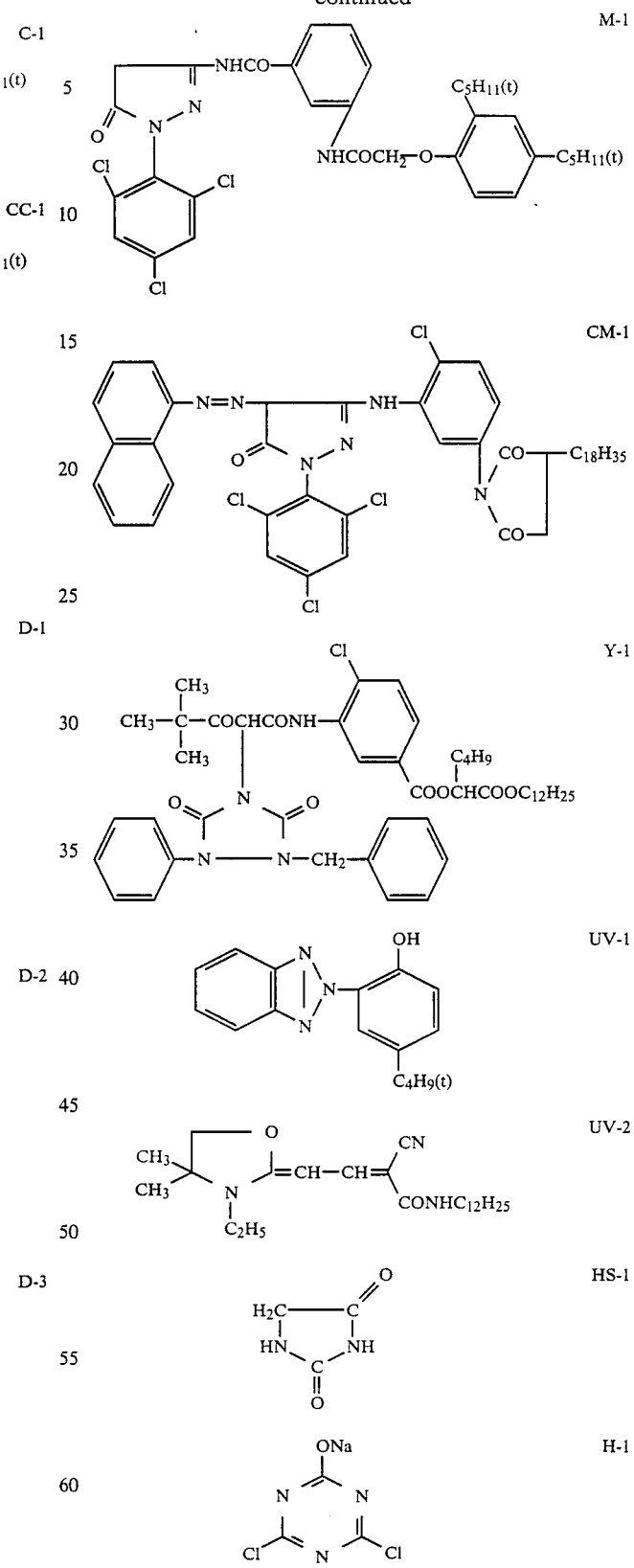
Next, sample 2 (the present invention) was prepared in which the second layer and the fifth layer which are intermediate layers and the eighth layer which is the yellow filter layer in sample 1 were replaced with the gelatin layers containing the emulsified dispersions of the compounds (5), (3) and (2) of the present invention, respectively. The respective amounts added were the $1.8 \times 10^{-4}$ mol per 1 m² which was the same as in sample 1 for the second and fifth layers, and only the compound 2 without addition of yellow colloidal silver and an emulsified dispersion of 2,5-di-t-octylhydroquinone in the eighth layer coated to an amount of 0.1 g/m². These layers were finished to a dried film thickness of 1.0 μm by controlling the amount of gelatin. Here, the amount of gelatin was 1.35 g/m².

The samples No. 1 and No. 2 thus prepared were subjected to wedge exposure and contact exposure to rectangular wave chart by use of white light, followed by the following developing processing.

The change in dried film thickness was controlled by the amount of gelatin, and the change rate in dried film thickness of the respective layers were made the same.

Processing steps (38° C.)
Color developing: 3 min. 15 sec.
Bleaching: 6 min. 30 sec.
Water washing: 3 min. 15 sec.
Fixing: 6 min. 30 sec.
Water washing: 3 min. 15 sec.
Stabilizing: 1 min 30 sec.
Drying The processing solutions used in the respective processing steps had the compositions as shown below.

[Color developing solution]
4-Amino-3-methyl-N-ethyl-N-(β-hydroxyethyl)aniline sulfate: 4.75 g
Anhydrous sodium sulfite: 4.25 g
Hydroxylamine·½ sulfate: 2.0 g
Anhydrous potassium carbonate: 37.5 g
Sodium bromide: 1.3 g
Trisodium nitrilotriacetate (monohydrate): 2.5 g
Potassium hydroxide: 1.0 g
Water to make 1 liter.

[Bleaching solution]
Iron ammonium ethylenediaminetetraacetate: 100.0 g
Diammonium ethylenediaminetetraacetate: 10.0 g
Ammonium bromide: 150.0 g
Glacial acetic acid: 10.0 ml
(Water to make 1 liter and adjusted to pH=6.0 by use of ammonia water)

[Fixing Solution]
Ammonium thiosulfate: 175.0 g
Anhydrous sodium sulfite: 8.5 g
Sodium metasulfite: 2.3 g
(Water to make 1 liter and adjusted to pH=6.0 by use of acetic acid)

[Stabilizing solution]
Formalin (37% aqueous solution): 1.5 ml
Konidax (produced by Konica Corporation): 7.5 ml
(Water to make 1 liter)

For the respective samples obtained by developing processing, relative sensitivity (S) and sharpness (MTF) were measured. The results are shown in Table 1.

Relative sensitivity (S) is the relative value of reciprocal number of exposure dosage which gives the fog density of +0.1, and represented as the value relative to W sensitivity of sample No. 1 which is made 100. Improved effect of sharpness is measured by determining MTF (Modulation Transfer Function) of the dye image and shown as the relative value of MTF at 10 lines/mm (sample No. 1 is made 100).

TABLE 1

|  |  | Relative sensitivity | MTF (relative value) | $D_{min}$ |
| --- | --- | --- | --- | --- |
| Sample 1 | Red-sensitive layer | 100 | 100 | 0.25 |
| (Control) | Green-sensitive layer | 100 | 100 | 0.55 |
| Sample 2 | Red-sensitive layer | 100 | 115 | 0.25 |
| (Invention) | Green-sensitive layer | 101 | 119 | 0.50 |

As is apparent from Table 1, there is no lowering in sensitivity when the compound of the present invention is employed, with improvement of sharpness being recognized in red- and green-sensitive layers. (Since no difference is recognized between the sample Nos. 1 and 2 with respect to blue-sensitive layer, it is not listed in Table 1.) Also, because colloidal silver in the yellow filter layer was eliminated, fogging in the high sensitivity green-sensitive layer was suppressed. Further, color crossover through migration of the oxidized products of the color developing agents in the respective layers was identical with that of Control within the range of error, thus indicating that the compound of the present invention is an excellent oxidized color developer scavenger. That is, the compound of the present invention is a colored scavenger, and therefore functions for both antihalation and scavenger of the oxidized color developing agent, and besides decolored after processing, whereby also no increase in $D_{min}$ is recognized.

EXAMPLE 2

A multi-layer color photographic element sample 3 was prepared by forming the respective layer with the compositions shown below on a triacetylcellulose film support successively from the support side.

Sample-3 (Control)

First layer: halation preventive layer
Gelation layer containing black colloidal silver.
Second layer: intermediate layer
Gelatin layer containing an emulsified dispersion of 2,5-di-t-octylhydroquinone ($2.7 \times 10^{-4}$ mol/m²).
Third layer: low sensitivity red-sensitive layer halide emulsion layer
Monodispersed emulsion (Emulsion V) comprising AgBrI with an average grain size (r̄) of 0.3 μm containing 4 mol% of AgI: Coated silver amount 0.5 g/m²
Sensitizing dye I: $7.9 \times 10^{-4}$ mol per 1 mol of silver
Cyan coupler (C-2): 0.1 mol per 1 mol of silver
Fourth layer: high sensitivity red-sensitive silver halide emulsion layer
Monodispersed emulsion (Emulsion VI) comprising AgBrI with an average grain size (r̄) of 0.7 μm containing 3 mol% of AgI: Coated silver amount 0.8 g/m²
Sensitizing dye I: $3.4 \times 10^{-4}$ mol per 1 mol of silver
Cyan coupler (C-2): 0.2 mol per 1 mol of silver
Fifth layer: intermediate layer
The same gelatin layer as the second layer.
Sixth layer: low sensitivity green-sensitive silver halide emulsion layer
Emulsion V . . . Coated silver amount 1.0 g/m²

Sensitizing dye III: $4.3 \times 10^{-4}$ mol per 1 mol of silver
Sensitizing dye IV: $2.9 \times 10^{-4}$ mol per 1 mol of silver
Magenta coupler (M-2): 0.05 mol per 1 mol of silver.
Seventh layer: high sensitivity green-sensitive layer halide emulsion layer
Emulsion VI: Coated silver amount 1.0 g/m²
Sensitizing dye III: $1.8 \times 10^{-4}$ mol per 1 mol of silver
Sensitizing dye IV: $1.2 \times 10^{-4}$ mol per 1 mol of silver
Magenta coupler (M-2): 0.15 mol per 1 mol of silver.
Eighth layer: yellow filter layer
Gelatin layer containing yellow colloidal silver and an emulsified dispersion of 2,5-di-t-octylhydroquinone ($2.7 \times 10^{-4}$ mol/m²).
Ninth layer: low sensitivity blue-sensitive silver halide emulsion layer
Mono-dispersed emulsion (Emulsion VII) comprising AgBrI with an average grain size ($\bar{r}$) of 0.6 μm containing 3 mol% of AgI: Coated silver amount 0.4 g/m²
Yellow coupler (Y-1): 0.3 mol per 1 mol of silver.
Tenth layer: high sensitivity blue-sensitive layer halide emulsion layer
Mono-dispersed emulsion (Emulsion VIII) comprising AgBrI with an average grain size ($\bar{r}$) of 1.0 μm containing 3 mol% of AgI: Coated silver amount 0.8 g/m²
Yellow coupler (Y-1): 0.3 Mol per 1 mol of silver.
Eleventh layer: the first protective layer
Gelatin layer containing UV-absorbers UV-1 and UV-2 and $0.9 \times 10^{-4}$ mol/m² of 2,5-di-t-octylhydroquinone.
Twelfth layer: the second protective layer
Gelatin layer containing:
silver iodobromide (AgI 1 mol%, average grain size 0.06 μm): coated silver amount (0.3 g/m²); and
polymethyl methacrylate paticles (diameter 1.5 μm).
In the respective layers, in addition to the above compositions, gelatin hardener (H-1) and surfactants were added.

The compounds used other than the above Examples for preparation of sample 3 are as shown below:

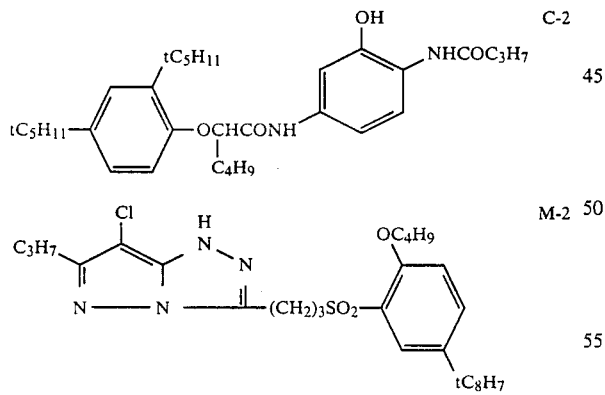

Next, the second layer and the fifth layer which are intermediate layers of sample 3 were respectively replaced with gelatin layers containing the emulsified dispersions of the compounds (7) and (8) of the present invention, and the amounts added were each made $2.7 \times 10^{-4}$ mol/m². The amount of gelatin added to the second layer and the fifth layer were 1.35 g/m², respectively. Further, in the third layer was added 2 mmol of (7) per 1 mol of silver, in the sixth layer 3 mmol of (8) per 1 mol of silver and in the ninth layer 3 mmol of (2) per 1 mol of silver, and the eighth layer was replaced with the gelatin layer containing an emulsified emulsion of (2) to a coated amount of 0.1 g/m², to prepare sample 4. The amount of gelatin added to the third layer, the sixth layer and the ninth layer were 2.0 g/m², 1.13 g/m² and 1.6 g/m², respectively.

The samples 3 and 4 thus prepared were each subjected to wedge exposure and then to reversal development following the processing steps shown below.

| Processing steps | | |
|---|---|---|
| Steps | Time | Temperature |
| First developing | 6 min. | 38° C. (±0.3) |
| Water washing | 2 min. | " |
| Reversal | 2 min. | " |
| Color developing | 6 min. | " |
| Controlling | 2 min. | " |
| Bleaching | 6 min. | " |
| Fixing | 4 min. | " |
| Water washing | 4 min. | " |
| Stabilizing | 1 min. | normal temperature |
| Drying | | |
| First developing | | |
| Water | | 700 ml |
| Sodium tetrapolyphosphate | | 2 g |
| Sodium sulfite | | 20 g |
| Hydroquinone monosulfonate | | 30 g |
| Sodium carbonate (monohydrate) | | 30 g |
| 1-Phenyl-4-methyl-4-hydroxy-methyl-3-pyrazolidone | | 2 g |
| Potassium bromide | | 2.5 g |
| Potassium thiocyanate | | 1.2 g |
| Potassium iodide (0.1% solution) | | 2 ml |
| Water to make | | 1000 ml |
| Reversal | | |
| Water | | 700 ml |
| Nitrilo-N,N,N—trimethylene phosphonic acid 6Na salt | | 3 g |
| Stannous chloride (dihydrate) | | 1 g |
| p-Aminophenol | | 0.1 g |
| Sodium hydroxide | | 8 g |
| Glacial acetic acid | | 15 ml |
| Water to make | | 1000 ml |
| Color developing | | |
| Water | | 700 ml |
| Sodium tetrapolyphosphate | | 2 g |
| Sodium sulfite | | 7 g |
| Sodium tertiary phosphate (dihydrate) | | 36 g |
| Potassium bromide | | 1 g |
| Potassium iodide (0.1% solution) | | 90 ml |
| Sodium hydroxide | | 3 g |
| Citrazinic acid | | 1.5 g |
| N—ethyl-N—(β-methanesulfonamidoethyl)-3-methyl-4-aminoaniline sulfate | | 11 g |
| Ethylenediamine | | 3 g |
| Water to make | | 1000 ml |
| Controlling | | |
| Water | | 700 ml |
| Sodium sulfite | | 12 g |
| Sodium ethylenediaminetetra-acetate (dihydrate) | | 8 g |
| Thioglycerine | | 0.4 ml |
| Glacial acetic acid | | 3 ml |
| Water to make | | 1000 ml |
| Bleaching | | |
| Water | | 700 ml |
| Sodium ethylenediaminetetra-acetate (dihydrate) | | 2.0 g |
| Iron (II) ammonium ethylenediamine-tetraacetate (dihydrate) | | 120.0 g |
| Potassium bromide | | 100.0 g |
| Water to make | | 1.0 liter |
| Fixing | | |
| Water | | 800 ml |
| Ammonium thiosulfate | | 80.0 g |
| Sodium sulfite | | 5.0 g |
| Sodium bisulfite | | 5.0 g |
| Water to make | | 1.0 liter |
| Stabilizing | | |

-continued

| Water | 800 ml |
|---|---|
| Formalin (37 wt. %) | 5.0 ml |
| Surfactant solution (trade name: Konidax) | 5.0 ml |
| Water to make | 1.0 liter |

The samples obtained were entirely the same in sensitivity and color turbidity, and also graininess was evaluated by RMS at the density 1.0 to give the results shown in Table 2.

TABLE 2

| | Graininess (RMS) | | |
|---|---|---|---|
| | Red-sensitive layer | Green-sensitive layer | Blue-sensitive layer |
| Sample 3 | 31 | 29 | 53 |
| Sample 4 | 25 | 25 | 46 |

Improvement of graininess can be clearly recognized. This may lead to the estimation that the compound of the present invention functioned as the scavenger of the oxidized color developing agent in the layer, thus playing a role as a kind of competing coupler.

The present invention, which can reduce the number of additives by imparting multiple functions to one molecule by introducing a non-light-sensitive dye and an anti-color-stain agent into the same molecule, enables alleviation of equipments in manufacturing of color light-sensitive materials. Further, not only complicated preparation of coating solutions became easier, but also performances of the color light-sensitive materials obtained are excellent as shown in Tables 1-2, and therefore color light-sensitive materials having good sharpness, graininess and further color reproduction can be obtained.

We claim:

1. A light-sensitive silver halide color photographic material, comprising at least one photographic constituent layer containing a gelatin and a multi-functional dye represented by Formula I or II:

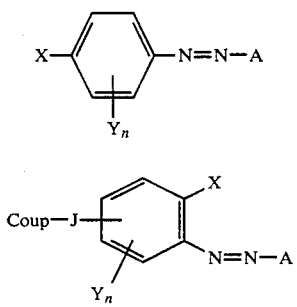

wherein, Coup is a coupler residue linked to J at the active site; J is a divalent group; A is an aryl group having a hydroxyl group at the o-position or the p-position relative to the azo group; X is a hydroxyl group or an amino group; Y is a monovalent organic group or a monovalent atom, and may form a naphthalene ring together with the benzene ring in Formula I or II; and n is an integer ranging from 0 to 4, provided that when said multi-functional dye is represented by Formula I, X is a hydroxyl group, an unsubstituted amino group or a monoalkylamino, and wherein said multi-functional dye becomes substantially colorless in the presence of the oxidized product of a color developing agent by reacting with said oxidized product, and becomes substantially colorless in the absence of said oxidized product of said color developing agent during a color-photographic processing step.

2. The light-sensitive silver halide color photographic material according to claim 1, wherein said multi-functional dye is contained in a layer positioned lower than a silver halide emulsion layer having photosensitivity at the main absorption wavelength region of said multi-functional dye.

3. The light-sensitive silver halide color photographic material according to claim 1, wherein Coup is a phenol type or naphthol type coupler residue; A is a phenol or naphthyl group; J is $-N=N-$, $-O-$, $-S-$ or $-NHSO_2-$; and Y is a halogen atom, an alkyl group, an electron attractive group or $-NHCOR$, where R is as defined above, and Y may form a naphthalene ring together with the benzene ring in Formula I or II.

4. The light-sensitive silver halide color photographic material according to claim 1, wherein at least one substituent on the aryl group represented by A and Y is an electron attractive group.

5. The light-sensitive silver halide color photographic material according to claim 1, wherein the compound represented by Formula I or II is a compound represented by the following formula:

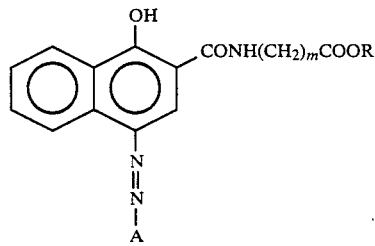

wherein A is as defined above, R is a hydrogen atom or an alkyl group having 2 or less carbon atoms and m is an integer ranging from 1 to 3.

6. The light-sensitive silver halide color photographic material according to claim 4, wherein said electron attractive group is $-CONH(CH_2)_mCOOR$, where m is an integer ranging from 1 to 3 and R is a hydrogen atom or an alkyl group having 2 or less carbon atoms.

7. The light-sensitive silver halide color photographic material according to claim 6, wherein said multi-functional dye is contained in a non-photosensitive layer.

8. The light-sensitive silver halide color photographic material according to claim 7, wherein said multi-functional dye is contained in an amount ranging from 0.01 g to 10 g per 1 g of said gelatin.

* * * * *